(12) United States Patent
Pedigo

(10) Patent No.: US 6,483,592 B2
(45) Date of Patent: Nov. 19, 2002

(54) TWO-PARTICLE INTERFEROMETER APPARATUS THAT REMOVES AN UNDESIRED ANTI-FRINGE OUTPUT

(76) Inventor: Michael Kenneth Pedigo, 9684 Autumn Way, Zionsville, IN (US) 46077

( * ) Notice: Subject to any disclaimer, the term of this patent is extended or adjusted under 35 U.S.C. 154(b) by 77 days.

(21) Appl. No.: 09/818,315

(22) Filed: Mar. 27, 2001

(65) Prior Publication Data

US 2002/0140941 A1 Oct. 3, 2002

(51) Int. Cl.[7] ................................................. G01B 9/02
(52) U.S. Cl. ....................................... 356/450; 356/484
(58) Field of Search ................................. 356/484, 450

(56) References Cited

U.S. PATENT DOCUMENTS

| | | | | |
|---|---|---|---|---|
| 5,574,557 A | * | 11/1996 | Bjork et al. | 356/345 |
| 5,796,477 A | * | 8/1998 | Teich et al. | 356/318 |
| 6,252,665 B1 | * | 6/2001 | Williams et al. | 356/450 |
| 6,430,345 B1 | * | 8/2002 | Dultz et al. | 385/122 |

OTHER PUBLICATIONS

Z. Y. Ou, L. J. Wang, and L. Mandel, Phys. Rev. A40, 1428 (1989).
P. Grangier, M. J. Potasek, and B. Yurke, Phys. Rev. A38, 3132 (1988).
C. K. Hong, Z. Y. Ou, L. Mandel, Phys. Rev. Lett. 59, 2044 (1987).
P. G. Kwiat, A. M. Steinberg, R. Y. Chiao, Phys. Rev. A45, 7729, (1992).
M. M. Fejer, Physics Today, May (1994), pp25.
Z. Y. Ou, L. J. Wang, X. Y. Zou, and L. Mandel, Phys Rev. A41, 566 (1990).

* cited by examiner

*Primary Examiner*—Robert H. Kim
*Assistant Examiner*—Irakli Kiknadze

(57) ABSTRACT

A two-particle interferometer is described that provides information transmission between non-local engtangled pairs of photons. Information transmission is made available through fringing resulting from quantum wavefunction superposition. A means to reduce an undesired anti-fringe signal is an important part of the invention.

26 Claims, 1 Drawing Sheet

TWO-PARTICLE INTERFEROMETER APPARATUS THAT REMOVES AN UNDESIRED ANTI-FRINGE OUTPUT

CROSS REFERENCE TO RELATED APPLICATIONS

No related application is known.

BACKGROUND OF THE INVENTION

The present invention relates, in general, to optical communications and, more particularly, to a method to transmit information between entangled pairs of parametric down-converted photons.

It is clear that parametric down-converted signal and idler fields are incoherent and there is no observable interference in either the signal or idler fields separately. However the down-converted signal and idler fields do carry phase information about a coherent pump field through quantum entanglement. An earlier approach by Ou et al (reference: Z. Y. Ou, L. J. Wang, and L. Mandel, Phys. Rev. A 40, 1428, 1989) utilized a "two-particle" interferometer and a coincidence counter to show that, in coincidence, probability amplitudes for sibling signal and idler photons can provide a type of observable interference (fringing). This interference a result of the phase entanglement of the signal and idler photons with the down-converted photons in the coherent pump field.

The "two-particle" interferometer in the Ou et al experiment utilized probability amplitude wavefunction superposition and a coincidence counter to "sort" both signal and idler photons. Our apparatus is a different "two-particle" interferometer, utilizing phase sorting "pilot beams" which replace and remove the necessity of the coincidence counter in the Ou et al experiment, thereby observing interference from fringing without coincidence.

Fringing in the idler and signal beams, with this "pilot beam" provoked sorting, is observable because an "anti-fringing" component is inhibited, thereby causing the "fringing" component to be observable. Normally the fringing and the anti-fringing components completely add and balance to remove any semblance of interference. The sorting from the coincidence counter in the original Ou et al interferomter acted to remove the anti-fringe component and in the apparatus described herein the "pilot beam" sorting likewise removes the anti-fringe component.

In the apparatus described herein observable interference in the signal field can be effected by changes in the idler or pilot fields. This is a gross non-local effect. Such a non-local effect could be exploited for advantages and/or advances in quantum computing and communications.

BRIEF SUMMARY OF THE INVENTION

Communications between two spatially separated locations utilizing non-local entanglements of quantum particles, such as photons, has promise of being much faster than communications through other known means of transmission. The present invention provides the ability to communicate information, non-locally, between entangled signal and idler photons that are generate by a parametric down-conversion process.

DETAILED DESCRIPTION OF THE PREFERRED EMBODIMENT

Figure 1:
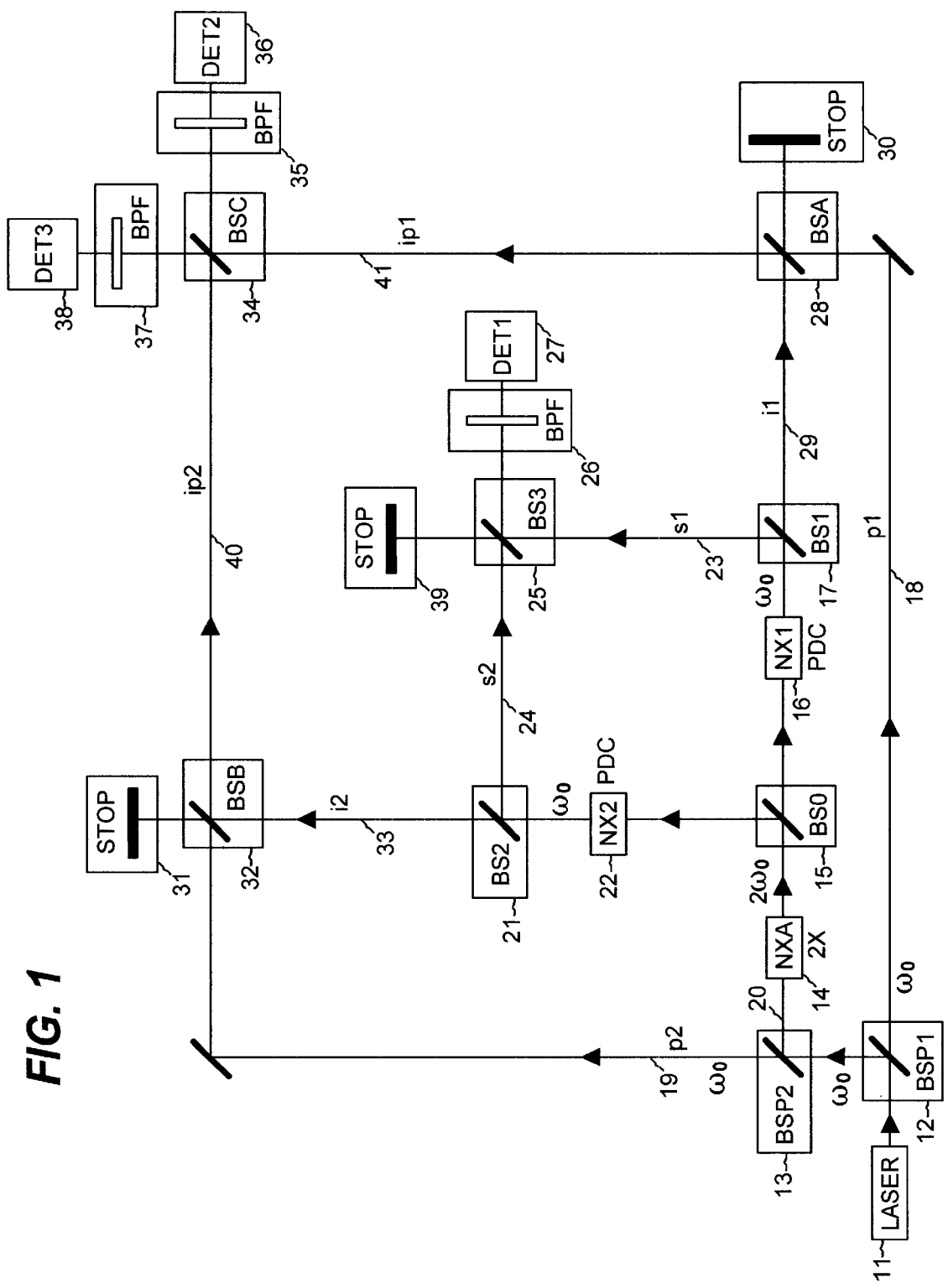
FIG. 1 is a block diagram of the apparatus that illustrates important components of the apparatus.

Please refer to the apparatus in FIG. 1. A laser 11 output is split into three beams by beamsplitters BSP1 12 and BSP2 13. The beams directed to beamsplitters BSA 28 and BSB 32 and labeled p1 18 and p2 19 are called the "pilot beams" and are of low intensity. The third beam 20 which is directed to a frequency doubling nonlinear crystal (NXA) 14 is at a high intensity such that there is good efficiency at frequency doubling by NXA 14. The frequency doubled output of NXA 14 is then split into two equal intensity beams (via beamsplitter BS0 15) with each beam directed to nonlinear crystals (NX1 16 and NX2 22) which provide on-axis degenerate parametric down-conversions. The down-converted beams from NX1 16 and NX2 22 propagate to beamsplitters BS1 17 and BS2 21 respectively both have a center frequency at $\omega_0$, the same center frequency of the laser output.

Beamsplitters BS1 17 and BS2 21 separate the two entangled down-converted photon fields, generally referred to as signal and idler fields. Since the signal and idler photons are identical due to being produced by a degenerate down-conversion process they are effectively separated by beamsplitters BS1 17 and BS2 21 which are both 50% partial reflective mirrors. The use of mirrors for BS1 17 and BS2 21 provide a 50% efficiency at separation of the signal and idler photons. Polarization separation devices, that separate fields into two orthogonally polarized fields can also be utilized in place of beamsplitters BS1 17 and BS2 21 and if properly aligned and rotated would provide more efficient separation, but the simplicity and low cost of partially reflective mirrors have made these components the choice for beamsplitters BS1 17 and BS2 21.

The signal beams s1 23 and s2 24 both propagate toward and impinge upon beamsplitter BS3 25. Beamsplitter BS3 25 is also a 50% partially reflective mirror. At BS3 25 the two signal beams s1 23 and s2 24 combine to produce quantum amplitude wavefunction interference with interference effects (fringing) being detected by detector DET1 27. Between detector DET1 27 and beamsplitter BS3 25 is a narrow bandpass filter BPF 26 which filters out undesired spectral parts of the signal fields 23 and 24 and also removes any residual pump field created at frequency doubling crystal NXA 14. The other output of BS3 25 propagates to a stop 39 which absorbs this other beam's energy.

The idler beams i1 29 and i2 33 propagate toward 50% partially reflective beamsplitters BSA 28 and BSB 32 respectively. At BSA 28 and BSB 32 these idlers beams 29 and 33 are combined with pilot beams p1 18 and p2 19 respectively. The combining of pilot and idler beams provides a phase sorting of the idler photons due to two photon interference effects[2] as described herein. One each of the outputs (ip1 41 and ip2 40) of beamsplitters BSA and BSB propagate toward 50% partially reflecting beamsplitter BSC 34 where the quantum amplitude wavefunctions of photons in beams ip1 41 and ip2 40 interfere. Interference being monitored by detectors DET2 36 and DET3 38. Between beamsplitter BSC 34 and detectors DET2 36 and DET3 38 are narrow band pass filters BPF 35 and 37 respectively. These BPF 35 and 37 filter out undesired spectral components of beams ip1 41 and ip2 40, as well as, remove any residual frequency doubled field created at NXA 14 and propagating toward detectors DET2 36 and DET3 38.

Detectors DET1 27, DET2 36, and DET3 38 are all photomultiplier tubes. However, other optical detectors could be utilized, such as, photodiodes. Although operation of the apparatus is based upon combining fields and detection of fields with only one photon at a time, the effects of interference are observed in the aggregate of multiple events. Therefore, single photon detection capability is not necessary.

The laser 11 is a pulsed laser with a spectral output of $\omega_0 \pm \omega_{3dB}$ (where $\omega_{3dB}$ is the half maximum power spectrum frequency spread from the center frequency $\omega_0$—i.e. 3 dB point), also the pulse rate is limited to:

$$R(\text{pulse}) < \pi/\omega_{3dB} \tag{1}$$

such that there is an "off" time between the laser pulses. Furthermore the pilot (18 and 19), idler (29 and 33), and signal (23 and 24) beams are all of low intensity. The expectation value of the pair production rate of signal and idler photons from NX1 16 or NE2 22 each is:

$$R(\text{idler}) << R(\text{pulse})/2. \tag{2}$$

Also for reasonably efficient "phase sorting" of idler photons at beamsplitters BSA 28 and BSB 32 the expectation value of the photon rate for each pilot beam p1 18 or p2 19 each is:

$$R(\text{pilot}) \approx R(\text{pulse})/2. \tag{3}$$

With these photon rate "R(idler) and R(pilot)" the probability of have one and only one pilot photon at beamsplitter BSA 28 (or BSB 32) while an idler photon is also impinging on BSA 28 (or BSB 32) is:

$$P(1 \text{ pilot with } 1 \text{ idler})=1/e. \tag{4}$$

Thus, for approximately 37% of the single idler photons arriving at BSA 28 (or BSB 32) there is also impinging one (and only one) phase sorting photon from the pilot beam 18 and 19.

The parametric down-conversion process creates signal and idler photons which have sharp time coincidences and generally much broader spectral bandwidths than the spectral bandwidth of the pump laser field. However, the detected (or otherwise measured) frequency of an idler photon and its pair produced signal photon are highly entangled, whereas the sum of the detected frequencies of the pair produced idler and signal photons is within the pump laser frequency spectral bandwidth. Referring again to FIG. 1, in front of all three detectors (DET1 27, DET2 36, and DET3 38) are band pass filters (BPF 26, 35, and 37). This limits the bandwidth of the detected signal and idler photons.

The time duration of the laser pulse is such that the pulse width spreads the laser output spectrum to match the bandwidth of the "detected" signal and idler fields—all three of these fields therefore have the same bandwidth and center frequency. This maximizes interference between the idler and pilot fields thereby optimizing the ability of the pilot field to direct the course of the idler photons emitted from beamsplitters BSA 28 and BSB 32.

There exists a phase match between the input field and the "$2^{nd}$ harmonic" output field from a frequency doubling crystal—this phase match being necessary for the generation of the $2^{nd}$ harmonic.[5] Thus, for the apparatus in FIG. 1, there is a constant phase relationship between the frequency doubled pump fields going to parametric down-converters NX1 16 and NX2 22, and the pilot beam fields p1 18 and p2 19 going to beamsplitters BSA 28 and BSB 32. (This phase relationship only holds within the coherence lengths of the pump fields and pilot fields.) Furthermore, phase information about the impinging NX1's 16 and NX2's 22 frequency doubled pump field is carried by the down-converted signal and idler fields in the parametric down-conversion process provided by nonlinear crystals NX1 16 and NX2 22.[6] The important phase relationships can be shown as follows:

phase of laser output and phase of the pilot beams is assigned as
$$e^\theta = \exp(ik_0 r - i\omega_0 t) \tag{5}$$

therefore, phase of freq. doubler output=phase of the pump for NX1 16 (and NX2 22)=$e^\theta$=$\exp(2ik_0 r - 2i\omega_0 t)$ \tag{6} and $[\exp(ik_s r - i\omega_s t + i\delta_{sN})][\exp(ik_i r - i\omega_i t + i\delta_{iN})] = \exp(2ik_0 r - 2i\omega_0 t) = (e^\theta)$ \tag{7} phase of the signal field+phase of the idler field=phase of the pump field for NX1 16 (and NX2 22).

Where N=1 for a down-conversion produced at nonlinear crystal NX1 16 and N=2 for a down-conversion produced at NX2 22.

The bandpass filters BPF 26, 35, and 37 are centered at $\omega_0$, this selects the detection of degenerate down-converted signal photons by the detectors (DET1 27, DET2 36, and DET3 38). The entangled idler photons (those entangled with signal photons that strike the detector "DET1 27") are similar in center frequency to the pilot and signal photons. Therefore, $$\omega_s = \omega_i = \omega_0. \tag{8}$$

The phase factors $\delta_{sN}$ and $\delta_{iN}$ are both a superposition of the values of 0 or $\pi$ with each of these values being equally likely. The on-axis propagation of the pair produced signal and idler photons and probability conservation limit the phase factors so that $\delta_{sN}, \delta_{iN} = 0,0$ or $\pi, \pi$. Likewise:

$$\delta_{sN} + \delta_{iN} = 0 \text{ or } 2\pi. \tag{9}$$

Equation 9 is a result of the entanglement of the signal and idler photons, whereas the phase information of the pump field is carried in the signal and idler fields jointly (in the sum) and not separately. However, even though the input pump fields to parametric down-converting crystals NX1 16 and NX2 22 are phase coherent the idler 29 and 33 fields, as well as, the signal fields 23 and 24 are not phase coherent. The superposition of equally likely values of 0 and $\pi$ radians imply that both the signal fields 23 and 24 and idler fields 29 and 33 are completely phase incoherent and that doing interferometry on the signal and idler fields will provide no fringing.

It should be noted that all theses phase relationships apply to the ensemble of photons in each field, for there is an uncertainty relationship between the phase of a field and the number of photons in a field. However, by averaging over a large number of photons, the measured phase approaches that shown in the above equations.

For pair produced signal and idler photons arriving at beamsplitters BS3 25 and BSC 34 respectively there is path erasure as to whether the down-conversion had been produced at either nonlinear crystal NX1 16 or NX2 22. Thus, there is a superposition of the quantum states from nonlinear crystals NX1 16 and NX2 22. Likewise, for pilot beam photons that arrive at beamsplitter BSC 34, there is similar path erasure, and there is a superposition of the pilot photon wavefunctions from beamsplitters BSA 28 and BSB 32. Notwithstanding this, for idler or pilot photons, which are deflected by beamsplitters BSA 28 or BSB 32 to beamsplitter BSC 34, path information is not erased and there is no superposition of the quantum states from the two paths.

Given the photon rates of relationship (1) and equation (2) above, there is a substantial probability of simultaneous arrival at beamsplitter BSA 28 (or BSB 32) by both an idler photon and a pilot photon. The idler field and pilot field have similar wavefunction characteristics, photons in both fields have similar center wavelengths and bandwidths (as limited by the narrow band pass filters BPF 35 and 37 before detection). Therefore there is superposition between the pilot field and idler field at beamsplitters BSA 28 and BSB 32 for photons that are detected by detectors DET2 36 and DET3 38?

An interesting two particle effect is observed whenever there is a single photon in the pilot beam, a single photon in the idler beam, and both photons arriving at beamsplitter BSA 28 (or BSB 32) simultaneously—that is, with both the idler and pilot photons having identical wavefunction characteristics—both photons will exit the beamsplitter in the same exiting direction[3]—the direction being dependent upon the relative phases between the pilot photon and the idler photon. This effect[4] produces a phase sorting of idler photons at BSA 28 and BSB 32. This phase sorting leads to phase dependent reduction or non-reduction of the quantum wavefunction. Idler photons with a certain phase relationship to the pilot photons strike the STOPS 30 and 31 and information about the source of the idler (NX1 16 or NX2 22) is not erased—the quantum wavefunction is reduced to either a down-conversion from NX1 16 or from NX2 22. However, for idler photons that strike beamsplitter BSC 34, the information about the source of the idler (NX1 16 or NX2 22) is erased—the wavefunction is not reduced and has simultaneous contributions to its amplitude from the possibility of a down-conversion from NX1 16 and a down-conversion from NX2 22.

The probability for a single idler photon, that is "phase sorted" and also being directed to BSC 34 is (with one simultaneous pilot photon at beamsplitter BSA 28 or BSB 32):

$$P(BS2) = 1 + \sin(\delta_N) \quad (10)$$

where $\delta_N$ is the phase difference between the idler photon and the pilot photon at beamsplitter BSA 28 or BSB 32 (N=1 or 2 respectively). From equation (7) and equation (9), the phase of the signal field can be represented as:

$$e^\theta = \exp(ik_0 r - i\omega_0 t + i\delta_{sN}) \text{ where } \delta_{sN} = 0 \text{ or } \pi \quad (11)$$

The signal field can be further represented as:

$$e^\theta = \exp(ik_0 r - i\omega_0 t + i\delta_{iN}) \text{ where } \delta_{iN} = 0 \text{ or } \pi \quad (12)$$

since for "on-axis" degenerate down-conversions the phase of the idler and signal photon is the same. However, $$\delta_N = \delta_{iN} + \alpha_{iN} - \alpha_{pN}, \quad (13)$$

where $\delta_N$ is the phase difference between the idler field (i1 29 or i2 33) and pilot field (p1 18 or p2 19) at beamsplitter BSA 28 or BSB 32, $\alpha_{pN}$ is the constant phase factor of the pilot beams p1 18 and p2 19 at BSA 28 or BSB 32 dependent upon the path lengths of the pilot beams 18 and 19, and $\alpha_{iN}$ is a phase constant which represents the phase difference in the idler field i1 29 (or i2 33) between NX1 16 (or NX2 22) and BSA 28 (or BSB 32) due to propagation from NX1 16 (or NX2 22) to BSA 28 (or BSB 32). Thus the signal field can be represented by:

$$e^\theta = \exp(ik_0 r - i\omega_0 t + i\delta_N + i\alpha_{pN} - i\alpha_{iN}). \quad (14)$$

At beamsplitter BS1 17 and BS2 21, the phase of the signal fields can further be represented by:

$$e^\theta = \exp(-i\omega_0 t + i\delta_N + i\alpha_{pN} - i\alpha_{iN} - i\alpha_{sN}), \quad (15)$$

where $\alpha_{sN}$ is a phase constant included due to the propagation delay from the down-converting crystal NX1 16 or NX2 22 and beamsplitter BS1 17, and where N=1 for the signal field from NX1 16, N=2 for the signal field from NX2 22.

In equation (15), it is important to note that all the "$\alpha$" terms are constants due to path lengths between beamsplitter—beamsplitter and between beamsplitter—nonlinear crystal. The "$\delta_N$" term is a random variable with two values ($=0+\alpha_{iN}-\alpha_{pN}$ or $=\pi+\alpha_{iN}-\alpha_{pN}$) representing the phase difference between the pilot 18 and 19 and idler 29 and 33 beams at beamsplitter BSA 28 or BSB 32.

The amount of superposition of the quantum wavefunctions depends upon the phase factors "$\delta_N$" (N=1 for BSA 28 and N=2 for BSB 32). Therefore, the probability of detecting a signal photon at detector DET1 (for signal photons which have pair produced and phase sorted idler photons) is:

P(DET-sorted)=(superposition of state functions from NX1 16 and NX2 22 for signal photons which have idler siblings which go to BSC 34)+(signal photons from NX2 16 that have idler siblings going to the "stop")+(signal photons from NX2 22 that have idler siblings going to the "stop")

P(DET1-sorted)=

$[(1+\sin\delta_1)^{1/2}\Psi(S1)+(1+\sin\delta_2)^{1/2}\Psi(S2)][(1+\sin\delta_1)^{1/2}\Psi(S1)+(1+\sin\delta_2)^{1/2}\Psi(S2)]*/8$ $+[1-\sin(\delta_1)][\Psi(S1)][\Psi(S1)]*/8+[1-\sin(\delta_2)][\Psi(S2)][\Psi(S2)]*/8 \quad (16)$ Which reduces to:

$P(\text{DET1-sorted}) = \Sigma(\delta_1 = \alpha_{i1} - \alpha_{p1}, \pi + \alpha_{i1} - \alpha_{p1}) \Sigma(\delta_2 = \alpha_{i2} - \alpha_{p2}, \pi + \alpha_{i2} - \alpha_{p2})$ $\{[1+\sin\delta_1]+[1+\sin\delta_2]+2(1+\sin\delta_1)^{1/2}(1+\sin\delta_2)^{1/2}[\sin(\delta_2-\delta_1+\alpha_{p2}-\alpha_{p1}+\alpha_{i1}-\alpha_{i2}+\alpha_{s1}-\alpha_{s2})]\}$ $+[1-\sin\delta_1]+[1-\sin\delta_2]\}/32 \quad (17)$ Since $\delta_1$ and $\delta_2$ are random variable, with $\delta_1$ having equal probability to be either ($0+\alpha_{i1}-\alpha_{p1}$ or $\pi+\alpha_{i1}-\alpha_{p1}$), and $\delta_2$ having equal probability to be either ($0+\alpha_{i2}-\alpha_{p2}$ or $\pi+\alpha_{i2}-\alpha_{p2}$), then equation 17 becomes:

P(DET1-sorted)=

$(\frac{1}{2})+(1/16)\{[1+\sin(\alpha_{i1}-\alpha_{p1})]^{1/2}-[1-\sin(\alpha_{i1}-\alpha_{p1})]^{1/2}\}$ $\{[1+\sin(\alpha_{i2}-\alpha_{p2})]^{1/2}-[1-\sin(\alpha_{i2}-\alpha_{p2})]^{1/2}\}\sin(\alpha_{s1}-\alpha_{s2}) \quad (18)$ Further simplifying and approximating (approximate to the first harmonic in Fourier series):

$P(\text{DET1-sorted}) \approx \{4+[\sin(\alpha_{i1}-\alpha_{p1})][\sin((\alpha_{i2}-\alpha_{p2})][\sin(\alpha_{s1}-\alpha_{s2})]\}/8 \quad (19)$ where:
- $\alpha_{p1}$ and $\alpha_{p2}$ are the phase constants of the pilot fields at BSA 28 and BSB 32 respectively,
- $\alpha_{s1}$ and $\alpha_{s2}$ are the phase differences in the signal fields due to propagation delays accumulated from BS0 15 to BS3 25 from path through NX1 16 (or through NX2 22 respectively), and
- $\alpha_{i1}$ and $\alpha_{i2}$ are the phase differences in the idler fields due to propagation delays accumulated from BS0 15 to BSA 28 through NX1 16 (or BSB 32 through NX2 22 respectively).

Equation (19) shows that the probability (or rate) of detection of signal photons by detector DET1 27 is dependent upon the path lengths of the idler beams i1 29 and i2 33

(and also dependent upon the path lengths of the pilot beams p1 18 and p2 19). Thereby allowing a communications path from the idler beams 29 and 33 (and/or pilot beams 18 and 19) to the signal beams 23 and 24 where information can be coded by modulating the path length of i1 29 and/or i2 33 (or p1 18 and/or p2 19) and this modulation can be recovered at detector DET1 27 by observing the resulting changes in the recovered fringes. This effect is useful for high speed communications and creating qbits in potential quantum computing applications.

Small movements of beamsplitter BSA 28 or BSB 32 will provide modulation of the path length of idler beams i1 29 and/or i2 33, this provides a form of phase modulation whereas the fringes detected at detector DET1 27 are shifted. Another approach to modulation would be to place a shutter in the path of idler beam i1 29 and/or i2 33 (or in the path of beams ip1 41 and/or ip2 40; or in the path of beams p1 18 and/or p2 19). The shutter state, open or close, thereby switches on and off the path erasure properties of beamsplitter BSC 34. This is a form of amplitude modulation since the result is to enhance or suppress the fringe visibility as detected by detector DET1 27.

It is important to note that this communications path effectiveness is maximum for the ensemble of instances where there is only one photon in the idler field (29 and 33) at a time. By phase sorting the idler photons and steering the idler photons with a certain phase to one of the "STOP"s 30 or 31 then the path of the idler photon is fixed (either from NX1 16 or NX2 22) and thereby the path of its sibling signal photon is also fixed due to entanglement. Therefore, there is no path superposition of signal photon quantum wavefunctions at detector DET1 27 (from NX1 16 and NX2 22) and no resulting interference for such signal photons with sibling idler photons going to the "STOP"s 30 or 31. This inhibition of superposition can be thought of as a removal of "anti-fringing" at detector DET1 27 whereas the desired "fringing" remains for signal photons that have sibling idlers photons being phase sorted and steered to beamsplitter BSC 34. Nonetheless, with an idler field composed of two simultaneous idler photons (and a signal field composed of the two sibling signal photons) there is a 50% probability that one idler photon would be directed from beamsplitter BSA 28 to the STOP 30 and a 50% probability the other idler photon would be directed from beamsplitter BSB 32 to the other STOP 31. For this case the two sibling signal photons would still interfere with each and contribute to fringing even though the path of each signal photon is known. Thus the "anti-fringing" removal is reduced 50% with two photon signal/idler fields.

For signal/idler fields each having photon numbers greater than two the efficiency of removal of the "anti-fringe" element rapidly is reduced by a factor of $2^{-N}$ as the photon number increases where N is the number of sibling pairs of signal/idler photons in each field.

The efficiency of removal of the "anti-fringe" element is less effected by the number of photons in the pilot field 18 and 19. With only one photon in the idler field, simple quantum mechanical amplitude additions show that the phase sorting efficiency with one pilot photon approaches 100%, with four simultaneous pilot photons the efficiency is reduced to 90%. Even with eight simultaneous photons in the pilot field the efficiency remains above 80%. With an "average" of one pilot photon per laser pulse the probability of having a quantity K of pilot photons for any one laser pulse is:

$$P_K = (1/e)(1/K!) \quad (20)$$

With perfect phasing and alignment of the pilot and idler bears the probability of effective sorting a single idler photon by a number of photons in the pilot field is:

$$P_S = [(\sqrt{K/2} + \sqrt{1/2})^2/(k+1)](1/e)(1/K!) \quad (21)$$

where K again equals the number of pilot photons

By summing over all K the percent probability that a single idler photon will be phase sorted correctly by the pilot field is 80% (this is for a pilot field intensity of one pilot photon on average per each laser pulse).

The apparatus shown in FIG. 1 utilizes on-axis degenerate parametric down-conversions to produce entangled signal and idler photons. The degenerate on-axis approach limits the phase of the down-converted signal and idler photons to that shown in equations (7) and (9) due to probability conservation—the random phase factors $\delta_{sN}, \delta_{iN}$ of the idler and signal photons are restricted to two sharp values with these values being 0 or $\pi$ radians. For degenerate off-axis down-conversions the equivalent random phase factors are not similarly limited and can have any possible value. However, due to entanglement, the sum of the signal and idler phases is sharp and limited to the phase of the pump field.

Because of non-discrete values of the individual random phase factors of the signal and idler photons for the off-axis case, the fringe visibility at an equivalent to DET1 27 for a similar apparatus using degenerate off-axis down-conversions, would be reduced 50% [due to integration over all possible phases for $\delta_1$ and $\delta_2$ in equation (16)]. However, for the approach using on-axis down-conversions (as shown in FIG. 1) the fringe visibility at DET1 is also equivalently reduced 50% since there is a 50% probability that the signal and idler photons will exit beamsplitter BS1 17 and BS2 21 in the same direction.

Therefore, off-axis and on-axis "degenerate" down-conversions will provide the same result. However, the on-axis approach is easier to visualize. Thus it is the approach utilized in the FIG. 1 shown apparatus.

I claim:

1. an interferometer, comprising:
   a laser;
   a beamsplitter means to split said laser output into three beams which are:
   a first pump beam,
   a first pilot beam,
   a second pilot beam;
   a frequency doubling means to create the second harmonic of the laser output;
   said first pump beam illuminating said frequency doubling means;
   output of said frequency doubling means illuminating a first parametric down-converter means and a second parametric down-converter means;
   said first parametric down-converter means producing first signal and first idler photons;
   said second parametric down-converter means producing second signal and second idler photons;
   a first phase sorting means to combine said first pilot beam with said first idler beam to phase sort photons from said first idler beam;
   a second phase sorting means to combine said second pilot beam with said second idler beam to phase sort photons from said second idler beam;
   a first path erasure means for combining one of the outputs from the said first phase sorting means with one of the outputs from the said second phase sorting means;
   a second path erasure means for combining said first signal photons with said second signal photons;

a first detector means to detect photons from at least one output of the second path erasure means.

2. The invention of claim 1 wherein the said laser is a pulse laser.

3. The invention of claim 1 wherein the said frequency doubling means is a non linear crystal.

4. The invention of claim 1 wherein the said first and said second parametric down-converter means are non linear crystals.

5. The invention of claim 1 wherein a band pass filter is placed between the said second path erasure means and the said first detector means.

6. The invention of claim 1 wherein said first and said second parametric down-converter means produces degenerate signal and idler photons.

7. The invention of claim 1 wherein said first and said second parametric down-converter means produces said signal and said idler photons that share the same propagation axis immediately after production.

8. The invention of claim 1 wherein said first and said second parametric down-converter means produces said signal and said idler photons that share the same propagation axis immediately after production and then are separated by a partially reflective mirror.

9. The invention of claim 1 wherein said first and said second parametric down-converter means produces said signal and said idler photons that share the same propagation axis immediately after production and then are separated by a polarization separating means.

10. The invention of claim 1 wherein said first and said second parametric down-converter means produces said signal and said idler photons that do not propagate on the same axis.

11. The invention of claim 1 wherein the said laser is a pulse laser that produces pulses with most of the pulse energy confined to less than a picosecond in duration.

12. The invention of claim 1 wherein said laser is a pulsed titanium sapphire laser.

13. The invention of claim 1 wherein said first phase sorting means is a partially reflective mirror.

14. The invention of claim 1 wherein said second phase sorting means is a partially reflective mirror.

15. The invention of claim 1 wherein said first path erasure means is a partially reflective mirror.

16. The invention of claim 1 wherein said second path erasure means is a partially reflective mirror.

17. The invention of claim 1 wherein the phase, amplitude, or frequency of said first idler photons and/or said second idler photons is modulated.

18. The invention of claim 1 wherein the amplitude of said first idler photons and/or said second idler photons is modulated by a shutter device that, by control, allows or inhibits the passage of said first and/or said second idler photons.

19. The invention of claim 1 wherein the phase or frequency of said first idler photons and/or said second idler photons is modulated by changing the path lengths traveled by said first and/or said second idlers photons.

20. The invention of claim 1 wherein the phase, amplitude, or frequency of said first pilot beam and/or said second pilot beam is modulated.

21. The invention of claim 1 wherein the amplitude of said first pilot beam and/or said second pilot beam is modulated by a shutter device that, by control, allows or inhibits the passage of said first and/or said second pilot beams.

22. The invention of claim 1 wherein the phase or frequency of said first pilot beam and/or said second pilot beam is modulated by changing the path lengths of said first and/or said second pilot beams.

23. The invention of claim 1 wherein the beam between said first phase sorting means and said first path erasure means is amplitude modulated.

24. The invention of claim 1 wherein the beam between said first phase sorting means and said first path erasure means is amplitude modulated by a shutter.

25. The invention of claim 1 wherein the beam between said second phase sorting means and said first path erasure means is amplitude modulated.

26. The invention of claim 1 wherein the beam between said second phase sorting means and said first path erasure means is amplitude modulated by a shutter.

* * * * *